(12) United States Patent
Oda

(10) Patent No.: US 8,536,762 B2
(45) Date of Patent: Sep. 17, 2013

(54) ANNULAR VIBRATION WAVE ACTUATOR

(75) Inventor: Yuki Oda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/423,492

(22) Filed: Mar. 19, 2012

(65) Prior Publication Data

US 2012/0262031 A1 Oct. 18, 2012

(30) Foreign Application Priority Data

Apr. 13, 2011 (JP) ................. 2011-088829

(51) Int. Cl.
*H01I 41/08* (2006.01)
(52) U.S. Cl.
USPC ..................................... 310/323.03

(58) Field of Classification Search
USPC ................. 310/323.02, 323.03, 323.3, 23.08, 310/323
See application file for complete search history.

(56) References Cited

U.S. PATENT DOCUMENTS

| 6,150,749 A | * | 11/2000 | Tamai et al. | ............. 310/323.12 |
| 2011/0227453 A1 | * | 9/2011 | Araki et al. | ............. 310/323.02 |

FOREIGN PATENT DOCUMENTS

| JP | 3049931 B2 | 3/2000 |
| JP | 2003-224987 A | 8/2003 |
| JP | 2009-273226 A | 11/2009 |

* cited by examiner

*Primary Examiner* — Mark Budd
(74) *Attorney, Agent, or Firm* — Fitzpatrick, Cella, Harper & Scinto

(57) ABSTRACT

Provided is an annular vibration wave actuator capable of distributing a contact surface pressure at a contacting portion over the entire contacting face and capable of reducing sliding in the direction orthogonal to the driving direction, thus improving durability.

6 Claims, 10 Drawing Sheets

ANNULAR VIBRATION WAVE ACTUATOR

BACKGROUND OF THE INVENTION

1. Field of the Invention

The present invention relates to annular vibration wave actuators including a vibration body and a movable body and configured to drive the movable body, and particularly relates to a shape of such a movable body.

2. Description of the Related Art

Conventionally, a vibration wave actuator configured to drive a movable body by vibration of a vibration body is known.

In such a vibration wave actuator, the vibration body typically includes an elastic body and a piezoelectric element as an electro-mechanical energy conversion element that is disposed on the elastic body.

The piezoelectric element having two driving phases at positions with a spatial phase difference of 90° therebetween is disposed on the elastic body, and two AC signals with a phase difference of 90° therebetween are applied to these two driving phases, whereby two bending vibrations are generated on the elastic body.

Then, a driving signal obtained by synthesizing these two bending vibrations shifts the movable body relative to the vibration body.

At least one of the vibration body and the movable body includes a friction member bonded, applied or formed at a contacting face thereof so as to produce an adequate friction force.

As driving by the actuator is repeated, this friction member becomes worn because the movable body slides to the vibration body. Therefore, the life of a vibration wave actuator can be lengthened by retarding such wear.

A contact surface pressure is confirmed as one of the factors deciding the wearing rate, and a smaller contact surface pressure can lengthen the life of a vibration wave actuator.

One of the methods of reducing such a contact surface pressure is to increase the area of a contacting portion.

Meanwhile, in order to avoid noise during driving, the contacting portion has to have elasticity.

To cope with these two matters, Japanese Patent No. 03049931 proposes a vibration wave actuator including a contacting portion formed with a beam-shaped member so as to support both ends of the contacting portion.

SUMMARY OF THE INVENTION

In order to improve durability of vibration wave actuators, it is not sufficient to simply increase the contacting area between the movable body and the vibration body, and it is desirable to distribute a contact surface pressure over the contacting face.

In the case of an annular vibration wave actuator, when viewing the vibration body during driving from a cross section passing through a center axis, the vibration body vibrates while rotating around a certain point, and it is desirable that a contacting portion of a driven portion with the vibration body follow such rotary vibration.

In that case, wearing of the contacting portion can be reduced by configuring the contacting portion not to slide in the radius direction orthogonal to the driving direction, whereby durability can be improved.

In view of these problems, it is an object of the present invention to provide an annular vibration wave actuator capable of distributing a contact surface pressure at a contacting portion over the entire contacting face and capable of reducing sliding in the direction orthogonal to the driving direction, thus improving durability.

An annular vibration wave actuator of the present invention includes: an annular vibrating portion provided with an electro-mechanical energy conversion element and configured to vibrate upon application of a driving voltage to the electro-mechanical energy conversion element; and an annular driven portion that comes into frictional contact with the vibrating portion and moves relative to the vibrating portion as the vibrating portion vibrates. The annular driven portion includes a contacting portion coming into contact with the vibrating portion and supported by two supporting portions made of a material having a spring property, the two supporting portions including an inner periphery side supporting portion protruding from an inner periphery side of the annular driven portion to a side of the vibrating portion and an outer periphery side supporting portion protruding from an outer periphery side of the annular driven portion to a side of the vibrating portion. The outer periphery side supporting portion and the inner periphery side supporting portion have different shapes and different stiffness so that a deformation amount of the outer periphery side supporting portion is larger than a deformation amount of the inner periphery side supporting portion.

According to the present invention, an annular vibration wave actuator capable of distributing a contact surface pressure at a contacting portion over the entire contacting face and capable of improving durability by reducing sliding in the direction orthogonal to the driving direction can be achieved.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

The following describes, as Embodiment 1, an exemplary configuration of an annular vibration wave actuator to which the present invention is applied.

Firstly, the driving principle of an annular vibration wave actuator of the present embodiment is described.

The annular vibration wave actuator of the present embodiment includes an annular vibrating portion provided with an electro-mechanical energy conversion element and is configured so that the annular vibrating portion vibrates upon application of a driving voltage to the electro-mechanical energy conversion element.

The annular vibration wave actuator further includes an annular driven portion that comes into frictional contact with the vibrating portion and moves relative to the vibrating portion as the vibrating portion vibrates.

Figure 1A:
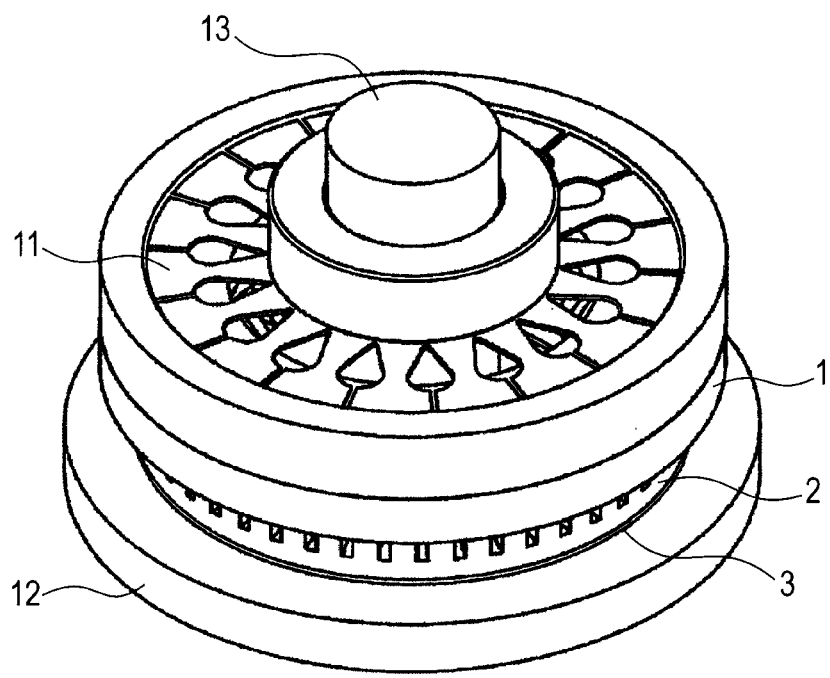
FIG. 1A illustrates an exemplary configuration of a vibration wave actuator that is Embodiment 1 of the present invention.
Figure 1B:
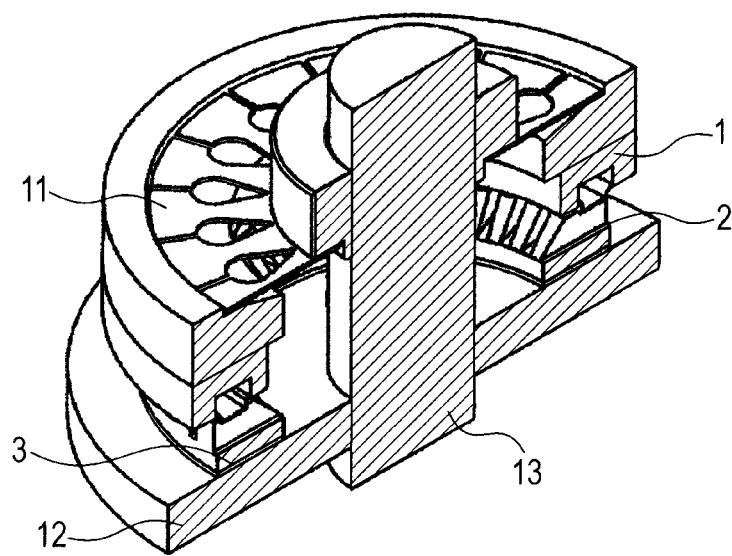
FIG. 1B illustrates an exemplary configuration of a vibration wave actuator that is Embodiment 1 of the present invention.

Referring to FIGS. 1A to 1B, such principle is specifically described below. FIG. 1A is a perspective view of the vibration wave actuator of the present embodiment, and FIG. 1B is a cross-sectional view of the vibration wave actuator of the present embodiment.

In FIGS. 1A and 1B, reference numeral 1 denotes a driven portion, 2 denotes a vibration body, 3 denotes an electro-mechanical energy conversion element, 11 denotes a pressure spring to bring the driven portion into pressurized contact with the vibration body, 13 denotes a driving shaft and 12 denotes a vibration body supporting portion to support the vibration body.

The pressure spring 11 is shaped like a thin plate. The pressure spring 11 is fastened to the driving shaft 13 while being elastically deformed so as to exert a reactive force in the contacting direction, thus bringing the driven portion 1 in pressurized contact with the vibration body 2.

Two AC voltages with a predetermined phase difference are applied to the electro-mechanical energy conversion element 3 bonded to the vibration body 2, whereby travelling vibrational waves are excited at a vibrator made up of the vibration body 2 and the electro-mechanical energy conversion element 3.

Figure 12:
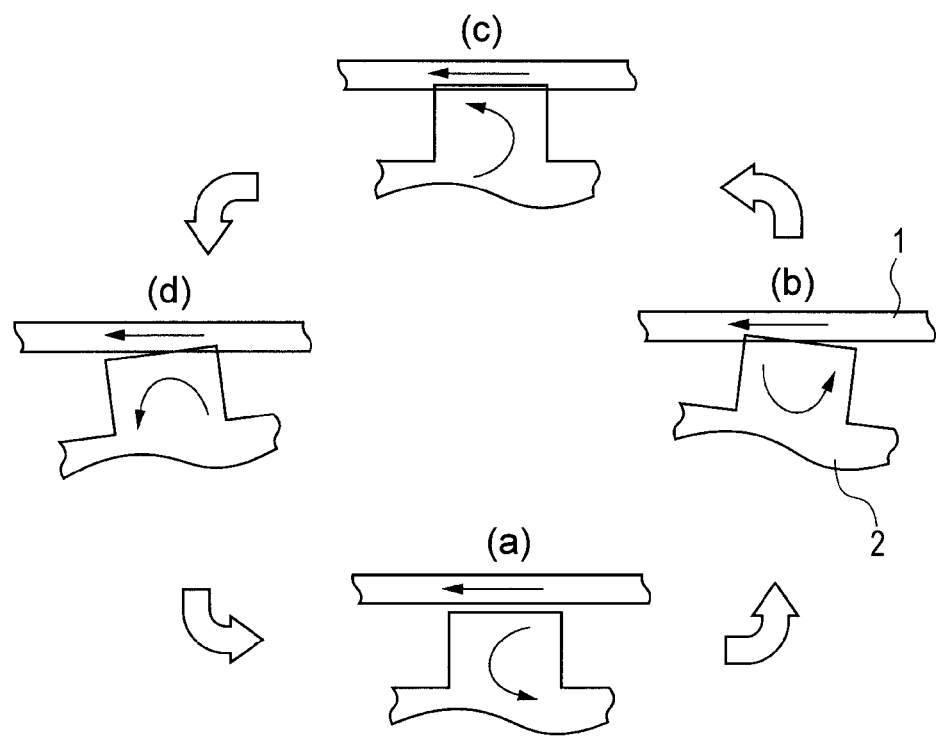
FIG. 12 is to explain the driving principle of a vibration wave actuator of the present invention.

As illustrated in FIG. 12, these vibrational waves generate a feeding motion along an elliptic orbit at the upper face of the vibration body 2.

Such a feeding motion drives the driven portion 1, which is in pressurized contact with the vibration body 2 under the pressure from the pressure spring 11, relative to the vibration body 2.

Figure 9:
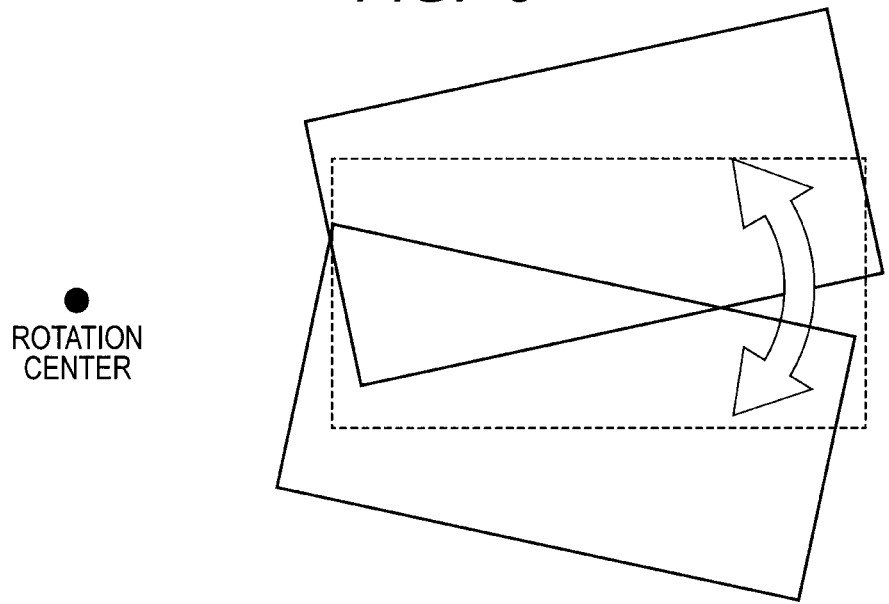
FIG. 9 illustrates a vibrating state of an annular vibration wave actuator of the present invention.

At this time, as illustrated in FIG. 9, when viewed from a cross section passing through a center axis, the vibration body 2 vibrates while rotating around a certain point.

The annular driven portion of the annular vibration wave actuator of the present embodiment includes a contacting portion supported by two supporting portions made of a material having a spring property including: an inner periphery side supporting portion protruding from an inner periphery side of the annular driven portion to a side of the vibrating portion; and an outer periphery side supporting portion protruding from an outer periphery side of the annular driven portion to a side of the vibrating portion.

Then, the outer periphery side supporting portion and the inner periphery side supporting portion have different shapes and different stiffness so that a deformation amount of the outer periphery side supporting portion is larger than a deformation amount of the inner periphery side supporting portion.

Figure 2:
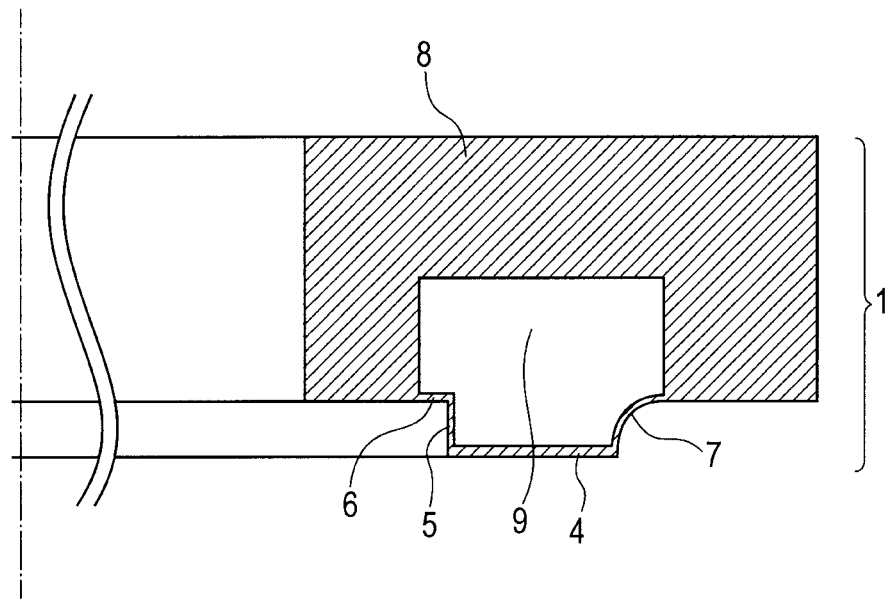
FIG. 2 illustrates a configuration of a driven portion of a vibration wave actuator that is Embodiment 1 of the present invention.

Referring to FIG. 2, the following describes an exemplary configuration of the present embodiment having different shaped outer periphery side supporting portion and inner periphery side supporting portion.

FIG. 2 is a cross-sectional view of a driven portion of the annular vibration wave actuator of the present embodiment.

The inner periphery side supporting portion includes a thin plate portion formed by bending a thin plate connecting the contacting portion and the driven portion at a right angle (or formed so as to bend at a right angle). In the present invention, the "right angle" refers to not only the precise angle of 90° but also the range of substantially 90° from which the effects of the present invention can be obtained from the viewpoint of a processing error or the like. Based on knowledge of the present inventors, the range of 90 °±3°, preferably 90°±1° is allowed. In the present invention, examples of the processing method of the thin plate include bending by press working as well as machining by cut working. More specifically, as illustrated in FIG. 2, the inner periphery side supporting portion includes a thin plate portion 6 connected to a main annular portion 8 and a thin plate portion as a first supporting portion 5 coupling with the thin plate portion 6 at a right angle.

The outer periphery side supporting portion includes an arc-shaped thin plate portion as a second supporting portion 7 connecting the contacting portion and the driven portion.

Then, the thus formed two supporting portions including the inner periphery side supporting portion and the outer periphery side supporting portion support a beam-shaped member, and this beam-shape member is a contacting portion 4.

Within these two supporting portions and the main annular portion is provided a space portion 9 to relieve the deformation of these two supporting portions.

In this way, in the present embodiment, the supporting portions have different shapes between the inner periphery side and the outer periphery side.

Such a configuration enables a difference in stiffness of the supporting portion between the outer periphery side and the inner periphery side of the vibrating portion when the vibration wave actuator drives so that the driven portion can be deformed more largely at the outer periphery side supporting portion than at the inner periphery side supporting portion.

Figure 3:
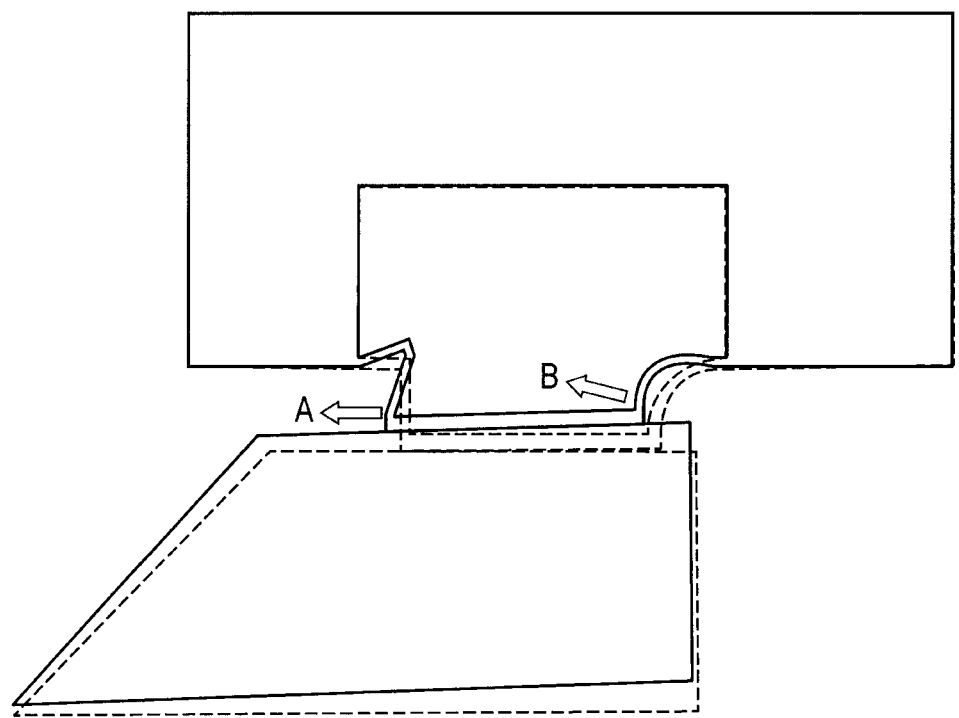
FIG. 3 illustrates a state of a driven portion and a vibrating portion at different moments during driving of a vibration wave actuator that is Embodiment 1 of the present invention.

FIG. 3 illustrates the deforming state in this case.

In FIG. 3, broken lines indicate a relationship between the driven portion and the vibrating portion of the vibration wave actuator at the moment when the displacement of the vibrating portion is 0. The solid line indicates the deformed state of the driven portion and the vibrating portion at the moment when the vibrating portion rises highest. During driving, the state of the broken lines and the state of the solid line are iterated.

Between these two supporting portions, the outer periphery side supporting portion is deformed greatly, and in order to allow the outer side supporting portion to move in the direction other than the direction raised by the vibrating portion, the first supporting portion moves in the direction of the arrow A and the second supporting portion moves in the direction of the arrow B as illustrated in FIG. 3.

Such deformation allows the contacting portion between the driven portion and the vibrating portion to be kept at the same position even during vibration.

Figure 10:
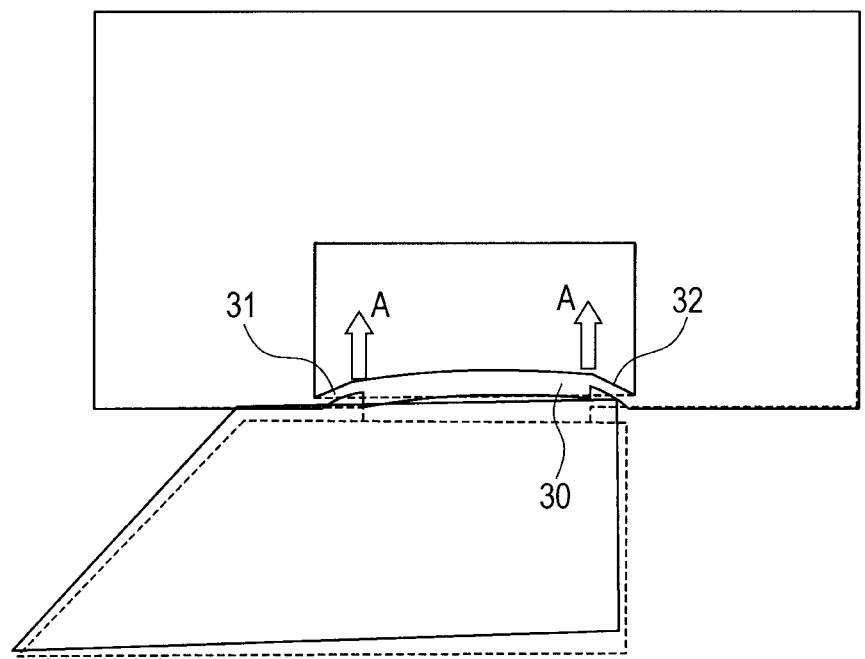
FIG. 10 illustrates a state of a driven portion and a vibrating portion at different moments during driving of a vibration wave actuator with a different configuration from that of embodiments of the present invention.

Herein, the following describes the deformation of the driven portion in the case where a contacting portion 30 is supported by a first supporting portion 31 and a second supporting portion 32 of the same shape as illustrated in FIG. 10.

In FIG. 10, similarly to FIG. 3, broken lines indicate a relationship between the driven portion and the vibrating portion of the vibration wave actuator at the moment when the displacement of the vibrating portion is 0, and the solid line indicates the deformed state of the driven portion and the vibrating portion at the moment when the vibrating portion rises highest.

Figure 11:
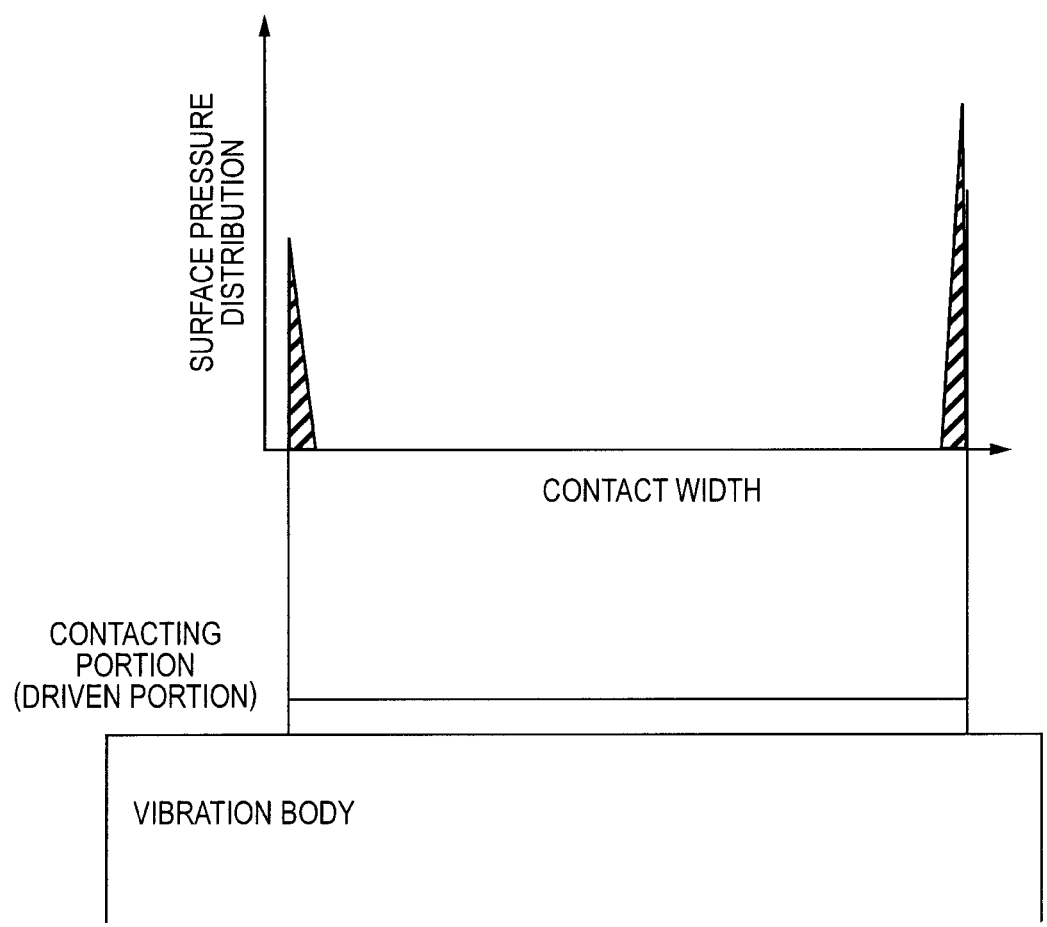
FIG. 11 illustrates a surface pressure distribution at a contacting face at a moment during driving of a vibration wave actuator with a different configuration from that of embodiments of the present invention.

In this case, as illustrated in FIG. 10, since the contacting portion 30 shifts in the direction of the arrow A, the shift to the inner radius side does not occur, which means that the contacting state differs between the zero displacement state and the highest rising state of the vibrating portion. Further as illustrated in FIG. 11, the contact surface pressure is concentrated on both ends of the contacting portion.

Figure 4:
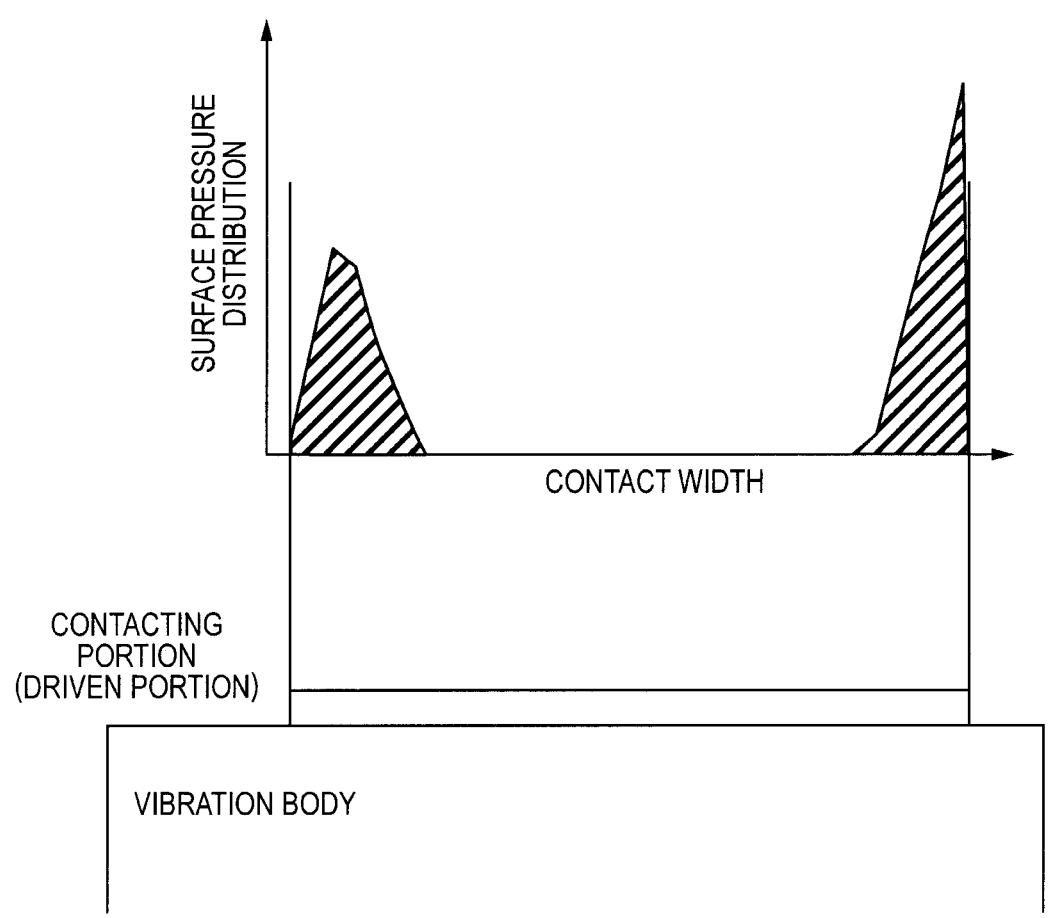
FIG. 4 illustrates a surface pressure distribution at a contacting face at a moment during driving of a vibration wave actuator that is Embodiment 1 of the present invention.

On the other hand, according to the configuration of the present embodiment, as illustrated in FIG. 4, the surface pressure distribution at the contacting portion between the driven portion 1 and the vibration body 2 extends not only to end portions but also to a central part of the contacting portion. Thereby, the surface pressure can be distributed over the face of the contacting portion 4.

In another configuration, the inner periphery side supporting portion may be configured similarly to FIG. 2, and the outer periphery side supporting portion may include a thin plate portion formed by bending a thin plate connecting the contacting portion and the driven portion at an angle larger than the right angle of the thin plate portion on the inner periphery side.

Figure 13:
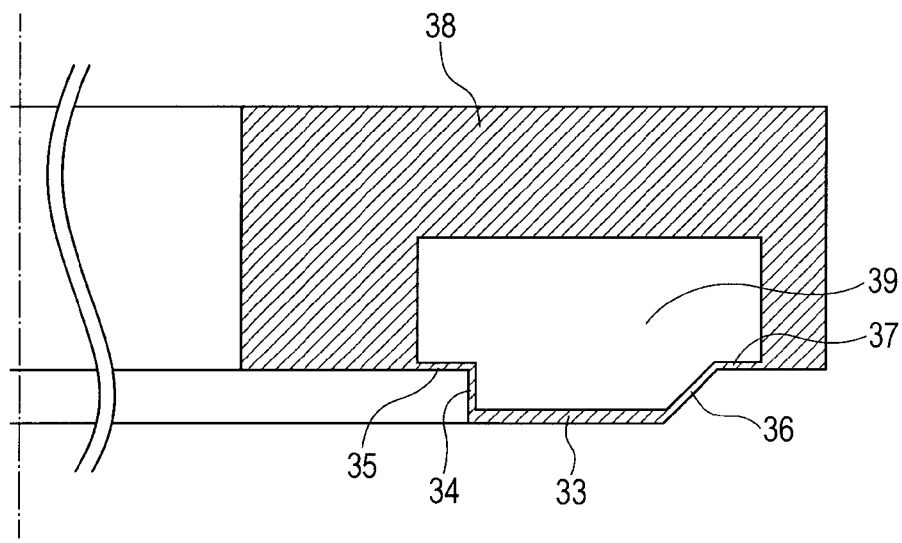
FIG. 13 illustrates another configuration of a vibration wave actuator that is Embodiment 1 of the present invention.

More specifically, as illustrated in FIG. 13, the inner periphery side supporting portion includes a thin plate portion 35 connected to a main annular portion 38 and a thin plate portion as a first supporting portion 34 coupling with the thin plate portion 35 at a right angle.

Then, the outer periphery side supporting portion includes a thin plate portion 37 connected to the main annular portion and a thin plate portion as a second supporting portion 36 coupling with the thin plate portion 37 at an angle larger than the right angle.

Then, the thus formed two supporting portions including the inner periphery side supporting portion and the outer periphery side supporting portion support a beam-shaped member, and this beam-shape member is a contacting portion 33.

Within these two supporting portions and the main annular portion is provided a space portion 39 to relieve the deformation of these two supporting portions.

Such a configuration also leads to similar effects.

Figure 14:
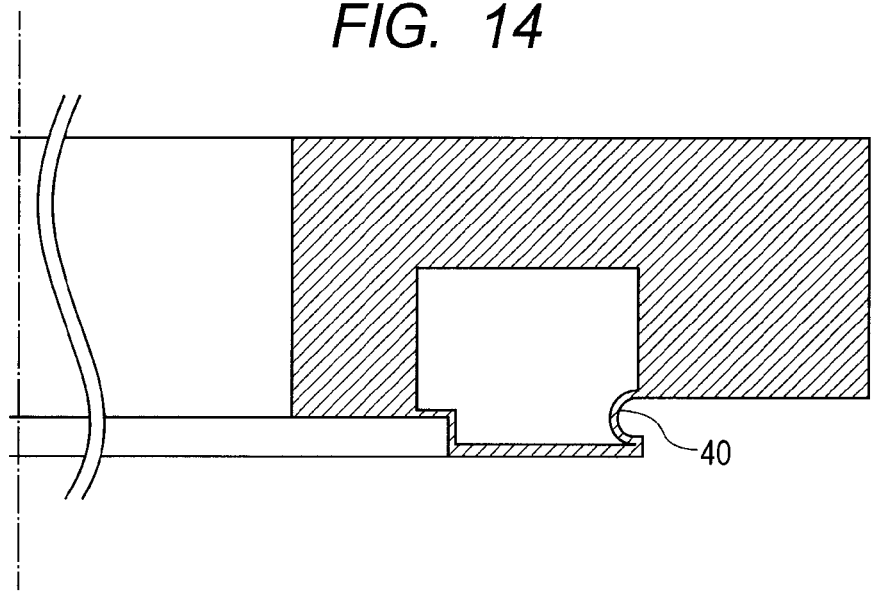
FIG. 14 illustrates still another configuration of a vibration wave actuator that is Embodiment 1 of the present invention.

In still another configuration, as illustrated in FIG. 14, the thin plate portion as the outer periphery side supporting portion is formed in an arc shape so that a region 40 formed in this arc shape is located on the inner periphery side of the end portion of the contacting portion.

Such configurations also can realize similar functions.

Embodiment 2

The following describes, as Embodiment 2, an exemplary configuration of an annular vibration wave actuator that is different from Embodiment 1.

Figure 5A:
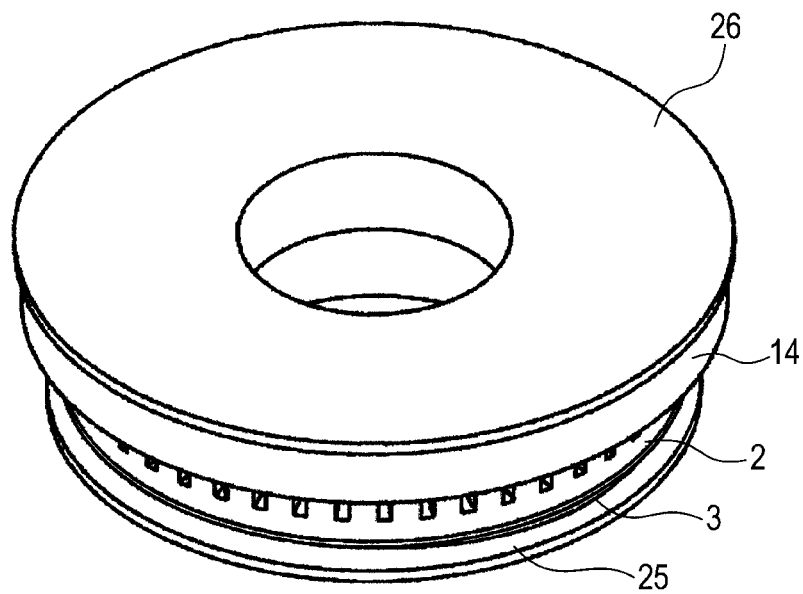
FIG. 5A illustrates an exemplary configuration of a vibration wave actuator that is Embodiment 2 of the present invention.
Figure 5B:
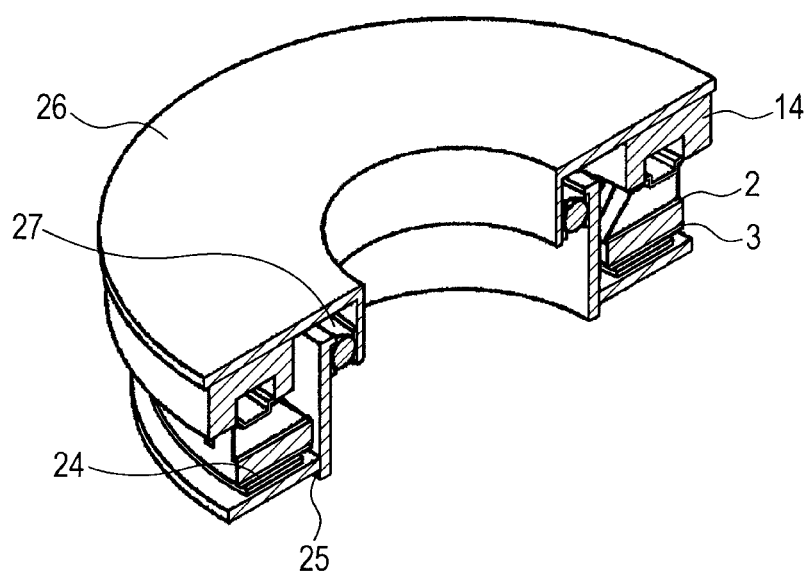
FIG. 5B illustrates an exemplary configuration of a vibration wave actuator that is Embodiment 2 of the present invention.
Figure 6:
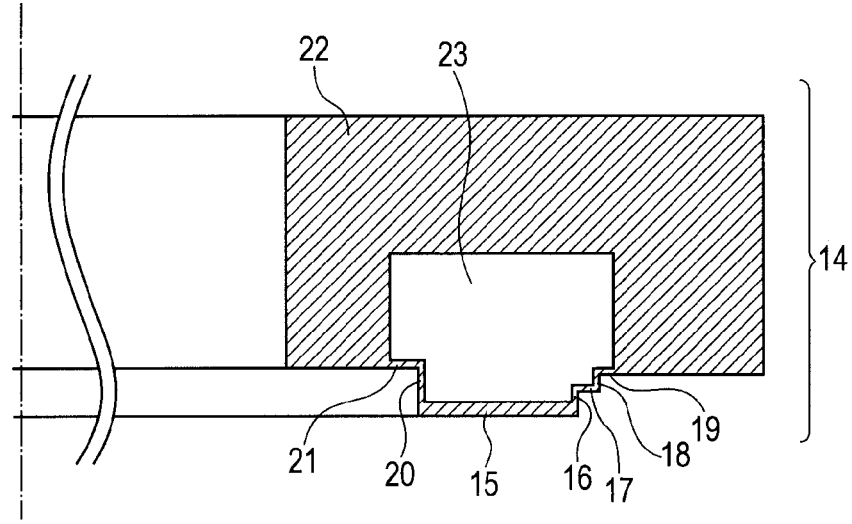
FIG. 6 illustrates a configuration of a driven portion of a vibration wave actuator that is Embodiment 2 of the present invention.

FIG. 5A is a perspective view of the annular vibration wave actuator of the present embodiment, and FIG. 5B is a cross-sectional view of the annular vibration wave actuator of the present embodiment. FIG. 6 illustrates the configuration of a driven portion of the annular vibration wave actuator of the present embodiment.

In FIGS. 5A and 5B, reference numeral 14 denotes a driven portion, 2 denotes a vibration body, 3 denotes an electromechanical energy conversion element, and 24 denotes a pressure spring to bring the vibration body into pressurized contact with the driven portion. Reference numeral 25 denotes a vibration body supporting portion to support the vibration body, and 26 denotes a rotation portion supported by the vibration body supporting portion 25 via a bearing 27 so as to be rotatable relative to the vibration body supporting portion 25 under the control of the driven portion 14.

Although the pressure portion in the present embodiment used is a wave washer, this may be a spring such as a coil spring.

Referring to FIG. 6, the following describes an exemplary configuration of the present embodiment having different shaped outer periphery side supporting portion and inner periphery side supporting portion.

The outer periphery side supporting portion includes a thin plate portion formed by bending a thin plate connecting the contacting portion and the driven portion twice at a right angle. In the present invention, the "right angle" refers to not only the precise angle of 90° but also the range of substantial 90° from which the effects of the present invention can be obtained from the viewpoint of a processing error or the like. Based on knowledge of the present inventors, the range of 90°±3°, preferably 90°±1° is allowed. In the present invention, examples of the processing method of the thin plate include bending by press working as well as machining by cut working.

More specifically, as illustrated in FIG. 6, the outer periphery side supporting portion includes a thin plate portion as a third supporting portion 16 connected to a contacting portion 15 and a first supporting portion 17 coupling with the thin plate portion as the supporting portion 16 at a right angle.

The outer periphery side supporting portion further includes a thin plate portion as a fourth supporting portion 18 coupling with the first thin plate portion 17 at a right angle and a second thin plate portion 19 coupling with the supporting portion 18 at a right angle and to be connected to a main annular portion 22. In this way, the outer periphery side supporting portion is configured.

The inner periphery side supporting portion includes a thin plate portion as a first supporting portion 20 connected to the contacting portion 15 and a thin plate portion 21 coupling with the thin plate portion as the supporting portion 20 at a right angle and to be connected to the main annular portion 22.

Then, the thus formed two supporting portions including the inner periphery side supporting portion and the outer periphery side supporting portion support a beam-shaped member, and this beam-shape member is the contacting portion 15.

Within these two supporting portions and the main annular portion is provided a space portion 23 to relieve the deformation of these two supporting portions.

Such a configuration enables a difference in stiffness of the supporting portion between the outer periphery side and the inner periphery side of the vibrating portion when the vibration wave actuator drives so that the driven portion can be deformed more largely at the outer periphery side supporting portion than at the inner periphery side supporting portion.

Figure 7:
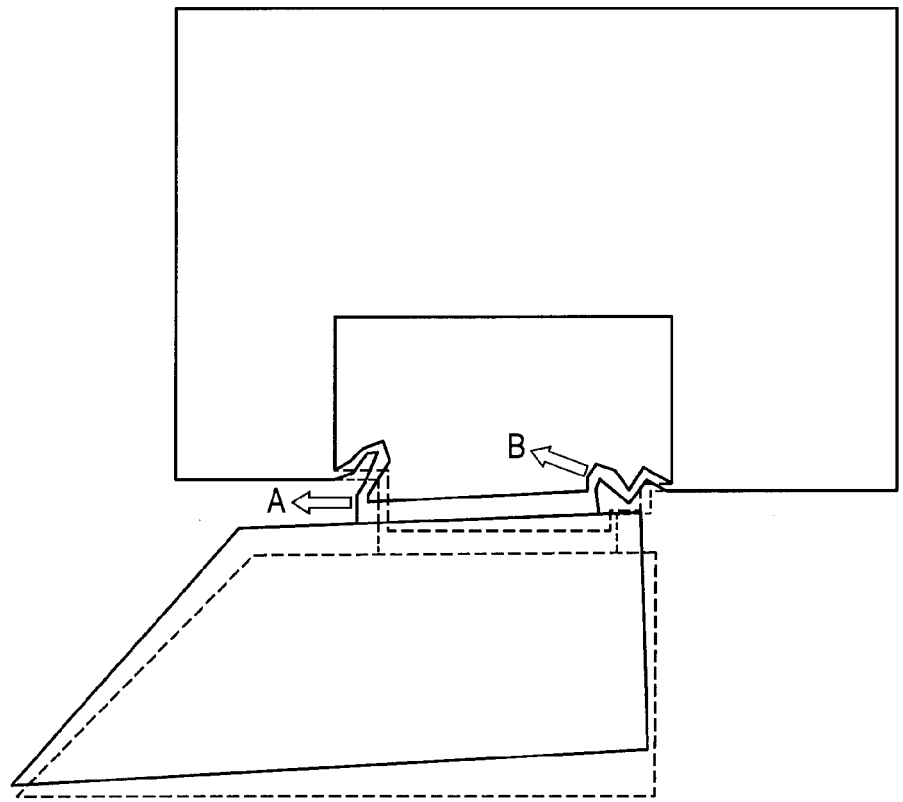
FIG. 7 illustrates a state of a driven portion and a vibrating portion at different moments during driving of a vibration wave actuator that is Embodiment 2 of the present invention.

FIG. 7 illustrates the deforming state in this case.

In FIG. 7, broken lines indicate a relationship between the driven portion and the vibrating portion of the vibration wave actuator at the moment when the displacement of the vibrating portion is 0. The solid line indicates the deformed state of the driven portion and the vibrating portion at the moment when the vibrating portion rises highest. During driving, the state of the broken lines and the state of the solid line are iterated.

Between these two supporting portions, the outer periphery side supporting portion is deformed greatly, and the outer side supporting portion can move in the direction other than the direction raised by the vibrating portion. Therefore as illustrated in FIG. 7, the first supporting portion (supporting portion 20 of FIG. 6) moves in the direction of the arrow A and the third and fourth supporting portions (supporting portions 16 and 18 of FIG. 6) move in the direction of the arrow B.

Such deformation allows the contacting portion between the driven portion and the vibrating portion to be kept at the same position even during vibration.

Figure 8:
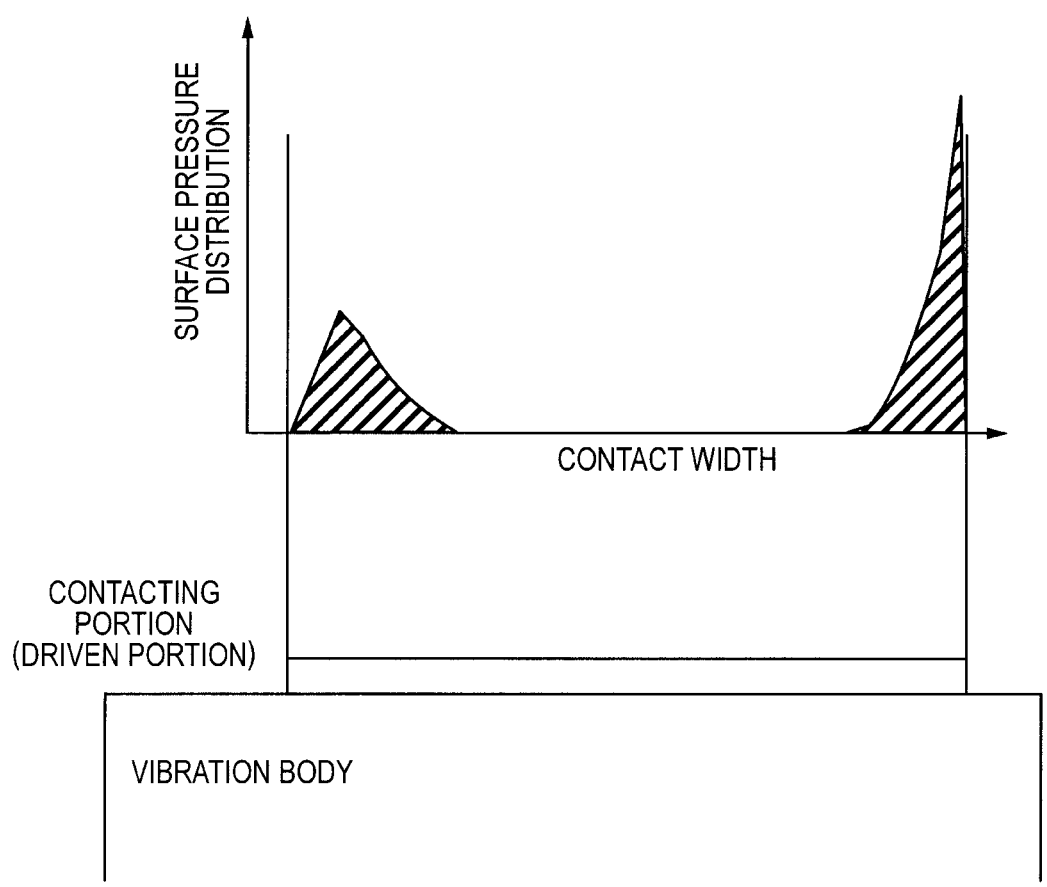
FIG. 8 illustrates a surface pressure distribution at a contacting face at a moment during driving of a vibration wave actuator that is Embodiment 2 of the present invention.

At this time, as illustrated in FIG. 8, the surface pressure distribution at the contacting portion between the driven portion 14 and the vibration body 2 extends not only to end portions but also to a central part of the contacting portion. Thereby, the surface pressure can be distributed over the face of the contacting portion 15.

Such a supporting portion with a two-step configuration is more suitable for processing than Embodiment 1, and can lead to similar effects.

Further, since the pressure portion is provided on the vibration body side, a space can be provided at a central part of the motor. Such a configuration is suitable for driving an optical member such as a lens.

In another configuration, the inner periphery side supporting portion may be configured similarly to the above FIG. 6, and the outer periphery side supporting portion may be configured with a thin plate portion that is formed by bending a thin plate connecting the contacting portion and the driven portion twice at an angle larger than the right angle of the inner periphery side thin plate portion. In the present invention, the "right angle" refers to not only the precise angle of 90° but also the range of substantially 90° from which the effects of the present invention can be obtained from the viewpoint of a processing error or the like. Based on knowledge of the present inventors, the range of 90°±3°, preferably 90°±1° is allowed. Then, "an angle larger than a right angle" refers to an angle relatively larger than the "right angle" in the aforementioned allowable range. In the present invention, examples of the processing method of the thin plate include bending by press working as well as machining by cut working.

Figure 15:
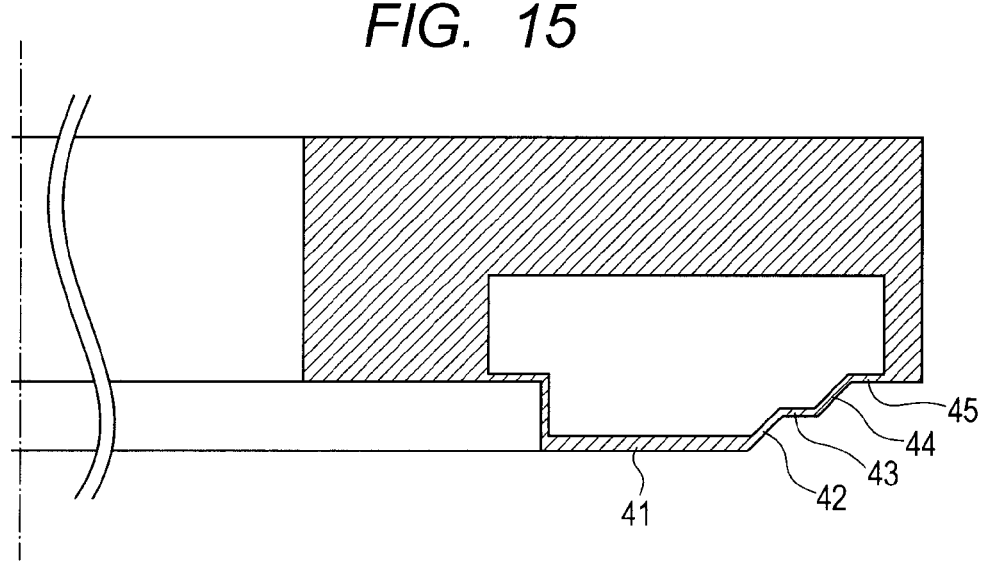
FIG. 15 illustrates another configuration of a vibration wave actuator that is Embodiment 2 of the present invention.

More specifically, as illustrated in FIG. 15, the outer periphery side supporting portion includes a thin plate portion as a fifth supporting portion 42 connected to a contacting portion 41 and a third thin plate portion 43 coupling with the thin plate portion as the supporting portion 42 at an angle larger than the right angle.

The outer periphery side supporting portion further includes a thin plate portion as a sixth supporting portion 44 coupling with the third thin plate portion 43 at an angle larger than the right angle and a fourth thin plate portion 45 coupling with the sixth supporting portion at an angle larger than the right angle and to be connected to a main annular portion. In this way, the outer periphery side supporting portion is configured. Such a configuration also can realize similar functions.

Any one of the fifth supporting portion 42 and the sixth supporting portion 44 may be vertically arranged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-088829, filed Apr. 13, 2011, which is hereby incorporated by reference herein in its entirety.

What is claimed is:

1. An annular vibration wave actuator, comprising:
   an annular vibrating portion provided with an electro-mechanical energy conversion element and configured to vibrate upon application of a driving voltage to the electro-mechanical energy conversion element; and
   an annular driven portion that comes into frictional contact with the vibrating portion and moves relative to the vibrating portion as the vibrating portion vibrates,
   wherein the annular driven portion includes a contacting portion coming into contact with the vibrating portion and supported by two supporting portions made of a material having a spring property, the two supporting portions including an inner periphery side supporting portion protruding from an inner periphery side of the annular driven portion to a side of the vibrating portion and an outer periphery side supporting portion protruding from an outer periphery side of the annular driven portion to a side of the vibrating portion, and
   the outer periphery side supporting portion and the inner periphery side supporting portion have different shapes and different stiffness so that a deformation amount of the outer periphery side supporting portion is larger than a deformation amount of the inner periphery side supporting portion.

2. The annular vibration wave actuator according to claim 1,
   wherein
   the inner periphery side supporting portion includes a thin plate portion that is a thin plate connecting the contacting portion and the driven portion and bending at a right angle, and
   the outer periphery side supporting portion includes an arc-shaped thin plate portion that is a thin plate connecting the contacting portion and the driven portion.

3. The annular vibration wave actuator according to claim 2,
   wherein
   the arc-shaped thin plate portion of the outer periphery side supporting portion is configured so that a region defined in the arc shape is positioned on an inner periphery side of an end portion of the contacting portion.

4. The annular vibration wave actuator according to claim 1, wherein
the inner periphery side supporting portion includes a thin plate portion that is a thin plate connecting the contacting portion and the driven portion and bending at a right angle, and
the outer periphery side supporting portion includes a thin plate portion that is a thin plate connecting the contacting portion and the driven portion and bending at an angle larger than the right angle of the thin plate portion on the inner periphery side.

5. The annular vibration wave actuator according to claim 1,
wherein
the inner periphery side supporting portion includes a thin plate portion that is a thin plate connecting the contacting portion and the driven portion and bending at a right angle, and
the outer periphery side supporting portion includes a thin plate portion that is a thin plate connecting the contacting portion and the driven portion and bending twice at a right angle.

6. The annular vibration wave actuator according to claim 1,
wherein
the inner periphery side supporting portion includes a thin plate portion that is a thin plate connecting the contacting portion and the driven portion and bending at a right angle, and
the outer periphery side supporting portion includes a thin plate portion that is a thin plate connecting the contacting portion and the driven portion and bending twice at an angle larger than the right angle of the thin plate portion on the inner periphery side.

* * * * *